April 17, 1956     L. F. WHITNEY ET AL     2,741,932
CRANKSHAFT AND METHOD OF MAKING THE SAME Filed April 23, 1952     3 Sheets-Sheet 1

Inventors
Lyman F. Whitney
William P. Matthew
by Roberts, Cushman & Grover
Att'ys April 17, 1956 L. F. WHITNEY ET AL 2,741,932
CRANKSHAFT AND METHOD OF MAKING THE SAME
Filed April 23, 1952 3 Sheets-Sheet 3

Fig. 10

Inventors
Lyman F. Whitney
William P. Matthew
by Roberts, Cushman & Groove
att'ys.

United States Patent Office 2,741,932
Patented Apr. 17, 1956

2,741,932

CRANKSHAFT AND METHOD OF MAKING THE SAME

Lyman F. Whitney, Cambridge, Mass., and William P. Matthew, Washington, R. I., assignors, by mesne assignments, to Isthmian Metals, Inc., a corporation of Massachusetts Application April 23, 1952, Serial No. 283,792

16 Claims. (Cl. 74—597)

This invention relates to a fabricated crankshaft or other composite structure and to the method of making the same. The principal object is to provide a crankshaft or other composite structure built up of comparatively simple parts by joining these simple parts to form a more complex structure in such a manner as to have at least the durability of a like structure produced by drop forging, with appreciable economies in manufacture. Another object is to provide a construction wherein the parts of the structure may be selected for their durability under the conditions to which they are subjected according to their location in the assembly so that optimum conditions of wear, bending, stress resistance and so forth may be had at a minimum cost. Other objects are to provide a novel connector element for joining the foregoing parts and to provide a method of making the same and assembling the parts therewith. The invention is illustrated specifically however, as applied to the manufacture of crankshafts.

The conventional crankshaft consists of main bearing shaft parts, throw arms, some of which may be weighted to serve as counterweights to balance the shaft as a whole, and crank pins. These parts vary in size, shape and mass. Accordingly, to drop-forge such a complex member as a whole is a relatively difficult expensive operation even though the individual parts thereof are comparatively simple. In accordance with this invention, the throw arms, main bearing parts and crank pins are made up as separate pieces and then joined together by means of a novel connector element which, as illustrated herein, forms a joint between the parts making a completed crankshaft which is as strong and in most cases stronger than a drop forged shaft. In accordance with the method of the invention the throw arms are cut or otherwise formed of sheet steel and the main bearing and crank pin parts are prepared from alloy steel bars so as to have end surfaces complementary to the adjoining faces of the throw arms. These component parts are then assembled together with positioning means and with permanent connector elements interposed between the adjoining complementary faces of each throw arm and crank pin or main bearing part in the form of rigid coherent discs or wafers comprised of a mixture of powdered iron, with powdered copper or prealloyed bronze powder, or with a mixture of powdered copper and tin wherein the copper constitutes at least 60% by weight, or with prealloyed silver and copper or with a mixture of powdered copper and silver wherein the copper constitutes at least 3% by weight, whereupon the assembly is heated to a temperature at which the non-ferrous powder fuses, alloying with the iron powder of the element itself and the metal of the parts being joined, to form a strong union between the parts, after which the bolts or other temporary positioning means may be removed or left in place as desired.

In another aspect the invention contemplates a crankshaft or other composite structure made up according to the foregoing method wherein each joint consists of a rigid lattice or network of iron comprising an element situated between the complementary surfaces of the parts united thereby and a continuous phase of a copper containing alloy at the interfacial contacts of the element with the parts.

The invention will be described in greater detail hereinafter with reference to the accompanying drawings, wherein.

In accordance with the invention the various crankshaft parts are made from steels which will best withstand the stresses which they will undergo in service. In some cases the main bearing parts and the crank pins are made of an alloy steel which has sufficient hardenability to give the required hardness at a relatively low cooling rate, whereas the throw arms are made of a plain carbon steel selected for its optimum combination of cheapness and toughness.

CRANKSHAFT COMPONENT PARTS

Referring to the drawings, the crankshaft is comprised of main bearing parts 10 and crank pins 12, each of which is in the form of a spool 14 having flat flanged ends 16 between which there is a cylindrical bearing surface 18. These may be machined from an alloy steel bar, for example AISI 8642 steel and preferably a pronounced fillet 20 is left at the junction between each flange and the cylindrical bearing surface thereby to reduce stress concentration and hence to prevent a starting point for cracks and subsequent failure of the crankshaft. An excess of metal 21 (Fig. 3) is left on the cylindrical surface, as indicated outside of the dotted line so that when the crankshaft is completely assembled the surfaces may be ground down to merge smoothly with the bottom of the fillet. It is desirable for the purpose of assembly, lightening the mass of the crankshaft as well as to provide for one kind of lubrication to bore the main bearing parts and pins to provide passages or holes 22, 24, respectively, therein to receive assembly bolts. The passages or holes 22 are formed concentrically of the main bearing parts, whereas the holes 24 are formed eccentrically of the crank pins for reasons which will appear hereinafter.

Figures 8, 9:
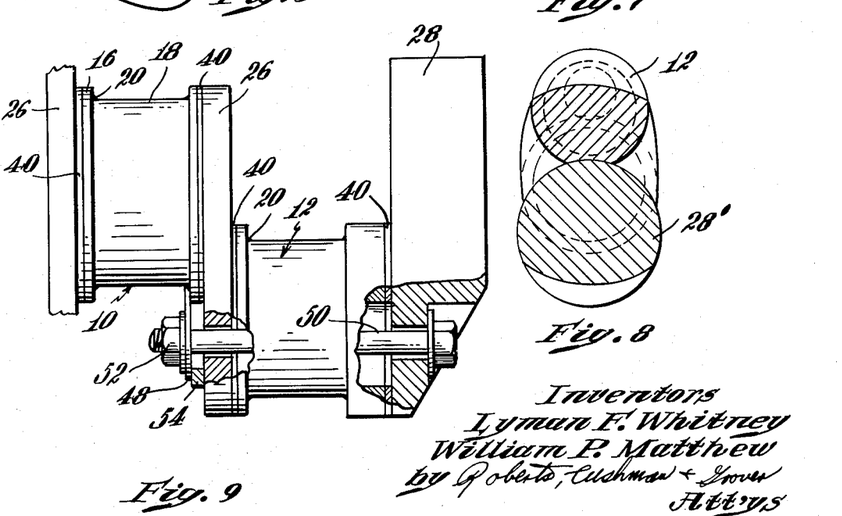
Fig. 8 is a section taken on the line 8—8 of Fig. 5.
Fig. 9 is an elevation of a part of the crankshaft showing the manner in which a counterweight is bolted to a bearing.

The throw arms whether strictly cranks 26 or a combination of crank and counterweight 28 need not be made from alloy steel, but can be made from plain carbon steel plate of the proper thickness and are cut to suitable shape, for example, by flame cutting. Likewise the counterweight 28' (Fig. 5), which does not function as a throw arm (Figs. 5 and 8) may be made from plain carbon steel. A sufficiently tough, comparatively inexpensive plain carbon steel such as AISI 1045 steel may be employed. At the places where a crank pin or main bearing part is to be attached there is formed a hole 30. In the crank arm the hole passes clear through the plate. In the main bearings the hole passes clear through, except for one end main bearing (not shown) which is merely drilled part way through and then tapped so as to receive a bolt passed through the crank to which it is to be bolted.

Figure 10:
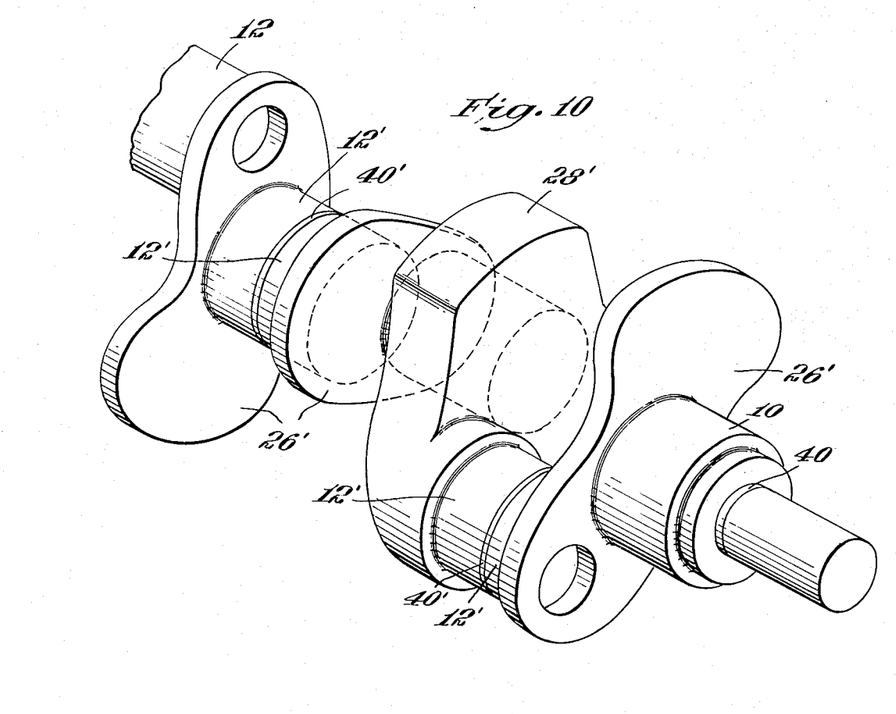
Fig. 10 illustrates a crankshaft of alternative construction wherein the bearing sections are joined intermediate their ends.

An alternative method of making an integrated crankshaft from steel components joined by connector elements is shown in Fig. 10. In this case the bearings 12' are joined at the center of their cylindrical sections by the connector elements 40'. Each steel part consists of one-half of a bearing element 12', a throw-arm 28' and one-half of another bearing 12'. The connector elements being located at the center of the bearing sections as shown are in a location of relatively low stress. This design is particularly well adapted to bonding by a local heating method rather than heating the entire assembly in a furnace since the connector element and the steel adjacent to it can be relatively symmetrical in shape and thus can be surrounded by an induction coil or if the heating is to be done by electrical resistance the electric current can be fed into the section in such a way as to give reasonably uniform current through the bond. This method of bonding is especially useful in making large crankshafts which would be difficult to heat in their entirety in a furnace.

THE CONNECTOR ELEMENT

The connector elements herein described can be used for connecting together various kinds of assemblies of steel parts. The method of bonding can be varied depending on the nature of the assembly. In some cases the parts can be assembled in a fixture with connector elements and the entire assembly heated to the bonding temperature in a furnace. In other cases especially where the assembly is large it may be more convenient to use a local heating method in which only the connector element and the steel immediately adjacent are heated to the bonding temperature. In the former case since it is usually not practical to apply enough pressure to the connector element during the bonding to secure densification the connector element is preferably made by briquetting the powder, sintering the element and then repressing it to a high density. In the latter case it is often convenient to apply enough pressure during bonding to densify the washer and then it is necessary only to briquet the washer, further densification being secured during the bonding operation to produce high strength in the bond. When an entire assembly is heated in a furnace the heating and cooling rates are relatively slow so that the assembly generally should be protected from oxidation during such heating and cooling. This is usually done by surrounding it with a reducing atmosphere such as hydrogen, dissociated ammonia or reducing atmospheres consisting of hydrogen and carbon monoxide produced by cracking of natural or producer gas. When a local heating method is used it may be unnecessary to use a protective atmosphere around the connector and the steel parts during bonding.

The connector element may be in the form of a flat disc, wafer or washer 40 (Fig. 4), is rigid, preferably has a diameter corresponding substantially to or slightly larger than the diameter of the flanged end of the crank pin or main bearing part, may vary in thickness from approximately .005 to over .25 inch in thickness, although the upper limit of thickness is not limited except by the outside or overall dimension of the crankshaft, and has an opening 42 through it which is eccentric with the crank pin or main bearing part and may have other cut-outs at points of low stress to save material. The density of the element will depend upon the coining pressure employed, and when coined at 90 tons per square inch, will be in the vicinity of 7.76–7.80 gm. per cc. before it is bonded to the steel parts.

Figure 4:
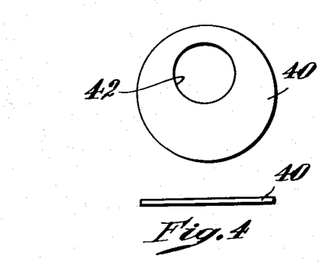
Fig. 4 is a plan and edge view of a connector element.

In the case illustrated in Fig. 4 the connector elements should be carefully made so as to be of nearly uniform thickness throughout since if there is any substantial variation in thickness there will be areas which will not make contact with the parts being joined, and hence a good bond will not be secured. The variation in thickness should be not more than .001 inch. Variations of less than this amount will be taken up by the combination of the increase in pressure which occurs during heating of the assembly as described hereinafter, by the fact that the iron lattice work is soft enough at bonding temperature to yield slightly at the points of highest pressure, that there is a slight irreversible expansion of the connector element during bonding and that there is a liquid phase present at the bonding temperature which can flow into the slight surface inequalities. The required uniformity of thickness can be achieved by surface grinding the connectors before assembly with the crankshaft parts, but as this is a relatively costly operation, it is generally preferable to use a special method of loading the powders into the die for the powder pressing operation, described hereinafter, which results in sufficient uniformity without the grinding.

The element is made of iron powder with powdered copper, or a mixture of copper and tin powder or pre-alloyed bronze powder or a mixture of copper and silver powders or powdered alloy of copper and silver. The powders are mixed in a conical blender or a ball mill in the proper proportions. In the mixture the non-ferrous metal is present in an amount of about 3% to about ⅔ of the total weight of mixture. Satisfactory results have been obtained with as little as 3% non-ferrous and as much as ⅔ non-ferrous, but a range of 5 to 40% is preferred. In this range 20 or 30% non-ferrous gives the best results depending upon the method of bonding.

Among the copper and tin mixtures 10% tin, 90% copper, is preferred, and may be in the form of a pre-alloyed powder or may be a mixture of tin powder with copper powder. When the non-ferrous powder is a copper-tin powder it should contain at least approximately 60% copper. When using a copper-silver powder copper should constitute at least 5% by weight of the mixture.

The preferred iron powder is electrolytic iron which normally has a very low percentage of total impurities, e. g. .1% or less, although other less pure powders having at least as much as 2.5% total impurities can be used. While a —100 mesh powder is preferred, powders having a higher percentage of fines may be employed with the advantage that a somewhat stronger product may result, but with the disadvantages that finer powders cost more and do not flow as readily in automatic compacting machines. The iron and non-ferrous powders are intimately mixed together with a suitable lubricant such as 1% stearic acid and the mixture is then poured into a molding die and compressed between punches, preferably in automatic powder pressing equipment. If the connector element is to be made in a single pressing operation a forming pressure sufficient to briquet it into a coherent compact but preferably not over about 90 tons per square inch is used. The compact may be in the shape of a disc or wafer-like body and is typified in that it is a mechanical unalloyed intimate mixture of iron powder and the non-ferrous powder in the proportions referred to above. While is is desirable not to exceed 90 tons per square inch it is usualy unnecessary to exceed 30 tons per square inch in making a suitable compact. Optionally, the prepressed unalloyed coherent compact is then sintered at a temperature sufficiently high to strengthen it and/or to remove work hardening induced in the pressing operation. Preferably, the temperature should not be above the melting point of the non-ferrous component. The sintering may be carried out for about an hour in a protective non-oxidizing atmosphere such as hydrogen, or cracked ammonia. This may serve to drive out the lubricant, relieve the hardness which has been induced by the first pressing and to form a rigid body in which the particles of the iron and the non-ferrous component remains substantially unalloyed but are nevertheless sintered together. When the connector element is to be made by a double pressing operation an initial forming pressure in the range 15–40 tons per square inch, but preferably at approximately 30 tons per square inch, forms the powder into a coherent, disc-like or wafer-like body typified in that it is a mechanical unalloyed mixture of iron powder and bronze or copper powder, or iron, copper and tin powders in the proportions referred to above. When the non-ferrous component comprises copper-tin mixtures or alloys, the prepressed unalloyed coherent disc or wafer is then given a first sintering at a temperature in the range 1200°–1900° F., preferably at approximately 1500° F. for ¼–3 hours, but preferably about 1 hour while in a protective reducing atmosphere such as hydrogen, cracked ammonia, or endothermic producer gas which serves to drive off the lubricant, relieve the hardness which has been introduced by the first pressing, and to form a rigid body in which the particles of iron and bronze remain substantially unalloyed but are nevertheless sintered together. When the non-ferrous component comprises copper-silver mixtures or alloys the connector may be sintered in the range 1000° F. to 1600° F. but preferably in the vicinity of 1100° F.–1300° F. under the protective atmosphere conditions described above. The sintered washer may then be repressed or coined in a press at a pressure of from 50 to 100 tons per square inch, the preferred portion of the range being approximately 60–80 tons per square inch. In the pressing operation it is preferable to keep the washer under a decreased pressure while it is being ejected from the die. This step is useful in keeping the washer flat. Otherwise a permanent deleterious buckle may be put in the washer.

While a variation in thickness of the connector element which is proportional to the distance along any given straight line across the face of the connector element can be tolerated provided it is not more than a few thousandths of an inch, a non-proportional variation of more than about .001 inch cannot be tolerated under certain furnace-bonding conditions. Such non-proportional variation is caused by depositing the powder in the die cavity in such a way that the charge of loose powder varies in density from point to point. When the powder is coined to very low porosity these variations in density become variations in thickness. Since the conventional method of loading the powder in the die cavity causes relatively large variations of this kind that cannot always be tolerated, a special method is used herein to secure a uniform distribution of the powder in the die cavity prior to the pressing and coining thereof. This is accomplished herein by sieving the powder so that it falls gently and uniformly into the die cavity from a sieve until the cavity is filled and there is a slight excess at the top, whereupon the excess is carefully scraped off working from the center line of the cavity outwardly thereby minimizing in so far as possible unequal densification of the underlying powder. When this method is followed the connector element, after coining, is found to have a thickness which is uniformly within .001 inch when the average thickness is approximately .03 inch. With conventional methods the variation is as much as .004 and such connector elements result in defective joints. The foregoing limits on thickness variations are particularly applicable when a high density wafer-like connector is to be used in an assembly which is to be heated in its entirety in a furnace to the bonding temperature. These limits are desirable, but much wider limits are permissible, when relatively low density connectors are to be used for bonding steel parts by heating only the connectors and adjacent steel by a local heating method, with sufficient pressure applied simultaneously to further densify the connector. This densification deforms the connector sufficiently to force it into contact with the steel in spite of some irregularities in adjoining surfaces of the connector and the steel parts.

It has been found that the connector elements made as described herein are non-isotropic with respect to their physical properties. For example the tensile strength of the material is considerably lower in the direction parallel to the motion of the punches during first pressing and coining than in any direction perpendicular thereto. It should be noted that the method of making the connectors and assembling them with the steel parts results in a crankshaft in which the tensile stresses on the connector elements come in the direction of their least strength. This is allowable in a crankshaft designed according to the principles described herein because the stresses on the connector element can be made considerably lower than the stresses in the fillets of the bearing parts. However, when greater strength in the connectors is required it can be obtained by arranging to have the connector elements so made and used that the stresses come perpendicular to the direction of the motion of the punches during manufacture of the connectors. Connector elements of intermediate strength can be produced by manufacturing the connectors in such a way that the motion of the punches during a second pressing or coining operation is perpendicular to the motion of the punches during the first pressing or powder pressing operation. These methods of producing connector elements of increased strength are generally more costly and although generally not necessary in the case of small crankshafts such as automobile engine crankshafts, may be justified in the case of larger crankshafts.

ASSEMBLY

Figures 1, 2, 3:
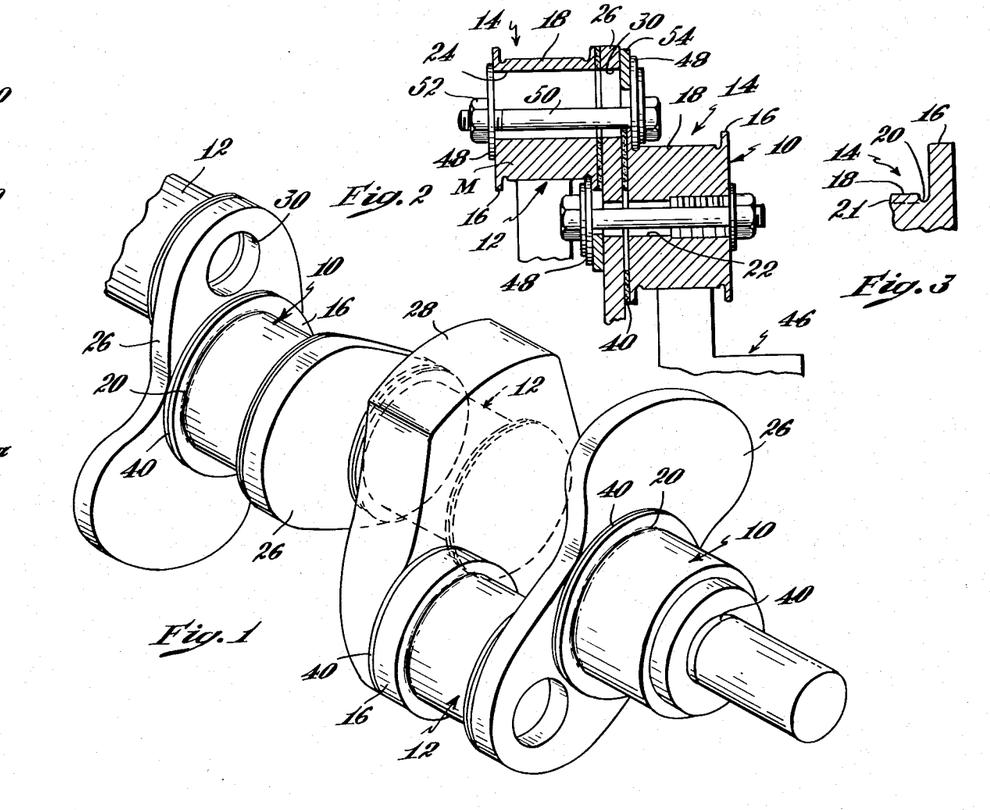
Fig. 1 is an isometric view of a part of a built-up crankshaft.
Fig. 2 is a section through a fragmentary test portion of the crankshaft showing the parts bolted together and resting on a jig.
Fig. 3 is a fragmentary section of a bearing spool to larger scale.

With the foregoing parts of the crankshaft and the prepared connector elements the crankshaft is assembled with bolts. These bolts serve to temporarily hold the parts together while the thermal union is being consummated, whereupon they may be removed as desired. A jig of suitable shape is provided in which the throw arms, crank pins and main bearing parts are placed in proper position with respect to each other (Fig. 2). Between each of the adjoining flat surfaces of a crank arm and crank pin or main bearing part there is placed a connector element 40 of suitable size, shape and thickness. Referring specifically to Fig. 2, which shows only a fragmentary part of the entire assembly, a metal washer 48 (not the connector element) is placed over the hole in the crank arm 26, a headed bolt 50 is passed through it, the hole 42 in the connector element, the hole 30 in the crank arm, the hole 24 through the crank pin, a second washer 48, and a nut 52 is placed on the end of the bolt and brought up wrench-tight against the washer to hold the parts substantially fixed. In an entire assembly the bolt would pass through the connector element, crank arm and washer at the opposite end of the crank pin before the nut 52 was applied. Shims or blocks 54 may be placed beneath the washers 48 to compensate for the thickness of the flanged end of the bearing member over which an edge of the washer 48 preferably lies. In like manner the remaining parts are bolted together, except at the center of the shaft where the bolts are threaded into the counterweight 28' (Fig. 5) and at the ends where the bolts are threaded into the bearings.

Figure 7:
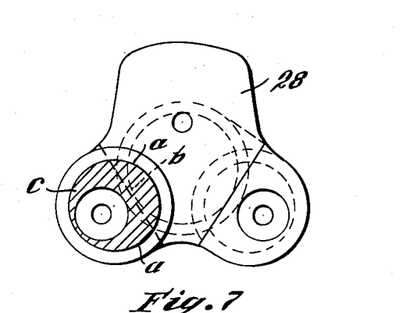
Fig. 7 is a section taken on the line 7—7 of Fig. 5 showing the common overlapping area of main bearing and crank pin.

Considerable care was exercised, in arriving at the most satisfactory shape and arrangement of the parts, to provide for optimum strength and lightness. As illustrated, the main bearing parts and the crank pins are arranged at opposite sides of a crank arm in axially unaligned positions (Figs. 1, 2 and 5) but with their end faces overlapping (Fig. 2) which is conventional in drop-forged shafts for the purpose of affording maximum strength. To lighten the weight without sacrifice in strength, and to provide temporary bolting as described above, the main bearing parts 10 are bored centrally while the crank pins 12 are bored eccentrically, and the crank pins are positioned so that they overlap the main bearing part as shown in Fig. 2, that is, by making the holes 24 in the crank pins eccentric, a comparatively large imperforate mass of metal, as illustrated, overlaps the imperforate portion of the main bearing parts, the overlapping common areas being marked G, being enclosed by the intersecting lines aba—aba (Fig. 7) and being lenticular in shape. Thus, when the parts are joined, there is a substantially continuous body of mutually supported metal between the lines x—x and y—y (Fig. 5) having a cross section as seen at C (Fig. 7). The plane z—z extending through the throw arm 26 from fillet to fillet of the crank pin and main bearing part constitutes the plane of maximum stress in the crank shaft under operating conditions.

Figure 5:
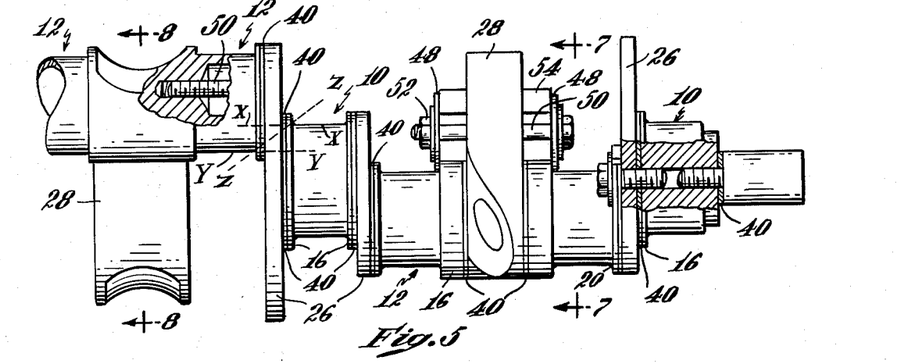
Fig. 5 is an elevational view of the crankshaft.
Figure 6:
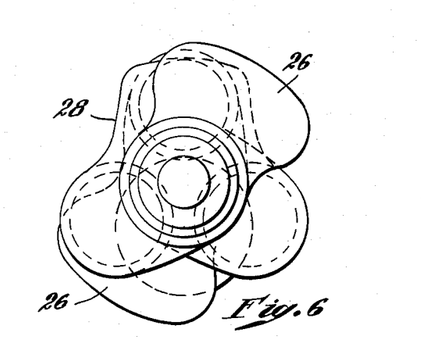
Fig. 6 is an end view looking from the right end of Fig. 5.

It is here pointed out that the connector element is of lower maximum strength than the steel parts. However, by making the diameter of the flange large enough and the connector element equal to or slightly larger than the diameter of the flange, the stress of the connector element can be reduced sufficiently so that under test conditions the stress concentration in the steel at the fillet reaches the maximum the steel can stand without breaking before the connector element reaches the maximum stress it can stand before it fails. Thus the strength of the entire shaft is determined by the strength of the individual steel bearing elements at the fillets rather than by the strength of joints. When test sections are tested to destruction in fatigue the failure occurs through the fillets of adjacent bearings in the plane of maximum stress designated z—z (Fig. 5).

Figure 4A:
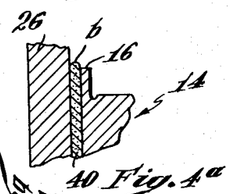
Fig. 4a is a section of a throw arm joined to a bearing spool to larger scale, showing the connector element with its peripheral edge extending appreciably beyond the flanged end of the bearing.

Unless special precautions are taken in making the connector elements, slight burrs are formed at the peripheral edges. This would be highly detrimental because it would prevent close contact between the connector elements and the abutting parts and hence during bonding an imperfect joint would be formed so that the joint would not carry the required load. By chamfering the peripheral edge of the connector element in accordance with the practice described in Patent No. 2,540,457, granted February 6, 1951 on an application of Richard E. Rice, filed December 5, 1945, the burr may be eliminated, but unless the connector element is made somewhat larger in diameter than the flange, welding will not take place at the peripheral edges of the connector element. To avoid this the connector element is made large enough so that the chamfered portion b lies beyond the peripheral edge of the flange, as shown in Fig. 4a.

Having thus temporarily joined the parts, the crankshaft supported in a jig suitable to stand the high temperature of the furnace is placed in the furnace and heated up to any commercially practical temperature above the melting point of the non-ferrous component of the connector but below the melting point of the iron. The jig material may be a nickel-chrome-iron alloy such as those known in the trade as Inconel or as 35–15. The preferred temperature is approximately 1900° F. to 2050° F. when the non-ferrous component of the connector element is bronze and copper respectively. Sufficient time should be allowed for the non-ferrous component to reach a temperature above its melting point so as to produce a liquid phase and during this time the assembly should be kept in a protective atmosphere such as hydrogen, cracked ammonia or producer gas. The union between the parts is consummated by fusion of the non-ferrous component, the iron remains sufficiently rigid so that the parts remain substantially in their original aligned position and an alloying of the non-ferrous component with the iron powder particles and the metal of the parts takes place so that there is a rigid network of iron between the parts and a continuous phase of the non-ferrous metal or an alloy thereof with iron at the interfacial contact of the parts with the element.

The network hereinafter called a skeletal structure for convenience in claim terminology, remains rigid with up to ⅔ part of non-ferrous powdered metal. While it is stipulated and it is believed that the skeletal structure loses no substantial amount of rigidity during the union so that there is no squeezing out of the iron from between the interfaces, there is probably a very slight softening accompanied by a slight volumetric swelling of the connector element which takes up any surface irregularities between the parts and provides an intimacy of contact impossible to attain with conventional machining.

Microscope examination of sections through the connector element and the steel parts after the bonding heat treatment, has shown that the exact original interface between the connector and the steel parts disappears during bonding, giving place to a diffusion zone formed by the molten non-ferrous-containing phase which flows into the small space between the parts, after which there is mutual alloying between the ferrous and non-ferrous components. The liquid non-ferrous-containing phase which fills the above-mentioned space comes from the body of the connector whence it is drawn by capillarity.

As noted hereinbefore, the degree of thickness variation in the connector which can be tolerated without jeopardizing the soundness of the bond is in general about .001 inch when the pressure applied to the connector during bonding is relatively low. However, this amount is governed to some extent by the particle size of the powders employed. It is desirable to have the maximum space between the connector and adjacent steel parts narrower than some of the larger interstices in the skeletal structure of the connector so that these spaces can fill themselves with liquid non-ferrous-containing phase drawn from these larger interstices by capillarity. Therefore, a somewhat larger thickness variation can be allowed in the connector when coarser powders are employed in its manufacture and also when the ratio of cuprous powder to ferrous powder is increased, this latter tending to increase the size of the interstices in the skeletal structure.

HEAT TREATMENT

After bonding, the assembly is slowly cooled to a temperature below the critical temperature of that steel in the assembly having the lowest critical temperature, may then be reheated for normalizing to 1550–1750° F. to refine the grain, and again cooled below the critical temperature. The shaft may then be tempered below the critical temperature to relieve any internal strains which may be present.

In the case of relatively small assemblies of the size used in automobile engines, the assemblies can be heated fairly rapidly to the bonding temperature, for example by placing the assembly in a retort and then placing the retort in a furnace already at the bonding temperature as described above. However, in some instances, and especially in the case of larger crankshafts, it may be desirable to heat the parts at a slower rate in order to prevent too large temperature gradients in the assembly during heating. This may be easily done for example by setting the furnace temperature controls at a temperature somewhat below the bonding temperature and allowing the parts to soak at this temperature before setting the controls at the proper bonding temperature, thus heating the parts in two stages. The heating rate can of course be made still slower by heating the parts in more than two stages.

In an alternative method of bonding the connector element may be made by briquetting at approximately 30 tons per square inch, a mixture of powders consisting of approximately 70% electrolytic iron of −250 mesh with 30% of a copper-silver powder containing approximately 50% silver and 50% copper also of −250 mesh, to form a porous but coherent connector element. The connector element so made is assembled between the steel parts which are to be joined. A pressure of approximately 1800 pounds per square inch is applied on the connector element by means of hydraulic pressure. The connector element and the adjacent steel are surrounded by the coil of a high frequency induction generator and by this means heated to approximately 1700° F. This combination of heat and pressure causes the connector element to become densified to a low residual porosity and at the same time to become permanently bonded to the steel elements. After cooling the connector element is a rigid structure of predetermined thickness consisting of a skeleton of iron throughout which there is dispersed the silver-copper alloy.

RESULT

Crankshafts made in accordance with the foregoing disclosure at marked savings in cost have a higher endurance limit than drop-forged shafts of the same bearing dimensions made from conventional forging steel.

Fatigue tests were run on a number of partial assemblies, as illustrated in Table I which follows hereinafter, wherein the critical section referred to is the plane $z$—$z$ (Fig. 5) of maximum stress discussed above. In this table under the heading "Type of break" the letters "D. N. B." means the sample did not break, and the word "Fillet" means that the sample broke through the fillets substantially in the plane $z$—$z$ (Fig. 5) of maximum stress.

Table I

BENDING FATIGUE TEST RESULTS USING VARIOUS PERCENTAGES OF BRONZE IN THE CONNECTOR ELEMENT

| Spec. No. | Percent Bronze | Percent Iron | Bending Moment at Critical Section, in lbs. | Cycles to Failure | Type of Break |
|---|---|---|---|---|---|
| 120 | 10 | 90 | ±6,300 | 1,100,000 | D. N. B. |
| 133 | 20 | 80 | ±13,500 | 30,000 | Fillet. |
| 137 | 20 | 80 | ±13,500 | 19,000 | Fillet. |
| 117 | 20 | 80 | ±11,150 | 68,000 | Fillet. |
| 132 | 20 | 80 | ±8,600 | 276,000 | Fillet. |
| 138 | 20 | 80 | ±7,000 | 2,271,000 | Fillet. |
| 116 | 20 | 80 | ±6,300 | 1,228,000 | Fillet. |
| 137 | 20 | 80 | ±6,000 | 10,000,000 | D. N. B. |
| 117 | 20 | 80 | ±5,550 | 10,000,000 | D. N. B. |
| 121 | 30 | 70 | ±6,300 | 1,063,000 | D. N. B. |

The procedure followed in making up the partial assembly and testing it in each of the test cases set forth in the foregoing table was as follows:

The test assembly used to obtain the foregoing results comprised a main bearing 10, a throw arm 26 and a crank pin 12 joined together by interposed connector elements 40 were made in the following manner:

The connector elements were made as follows: First, the desired percentage of bronze powder (90% Cu–10% Sn prealloyed powder −100 mesh) was mixed with iron powder (electrolytic −150 mesh) plus 1% lubricant in a conical blender for 20 minutes. An appropriate quantity of this mixture was then compressed into the form of discs or wafers at 250 tons (29 tons per sq. in). These discs were then placed in a retort furnace and sintered for 3 hours at 1500° F. in an atmosphere of cracked ammonia. After the first sinter the discs were repressed at 780 tons (90 tons per sq. in). The resulting coined discs were .030 inch to .033 inch thick and had a density of 7.76 to 7.80 gm. per cc. The discs were then reduced to the proper diameter and the eccentric holes described heretofore were cut therein.

The main bearing part 10, the throw arm 26 and the crank pin 12 with a connector element 40 interposed between the respective parts were then bolted together, as shown in Fig. 2.

The bolted assemblies were then placed in a retort furnace and heated to 1900° F. in a cracked ammonia atmosphere flowing at the rate of 10 cu. ft. per hour. As soon as the test assemblies were uniformly heated to 1900° F. the retort, with the test assemblies inside, was removed from the furnace and allowed to cool in still air. The outside of the retort cooled to 1000° F. in about 10 min., and the assemblies took about 30 min. to reach 1000° F. When the retort and assemblies therein were below 800° F. (after about 45 min.), the retort was placed in the furnace again (with the cracked ammonia atmosphere still flowing) and heated to 1600° F. for the normalizing treatment. At 1600° F. propane was bled into the atmosphere at the rate of 2 cu. ft. per hour, and the assemblies were held at this temperature for 1½ hours. At the end of this time the retort was again removed from the furnace and the propane was shut off, but the cracked ammonia continued to flow during the cooling to room temperature.

The assemblies were then removed from the retort, the bolts removed, and Rockwell hardness readings were taken on the main bearings and crank pins. The readings were within the range Rockwell C27 to 33. The assemblies were then tempered in the retort furnace with air atmosphere at 800° F. for 3 hours, and again cooled to room temperature. Rockwell readings were again taken and found to be in the same range. The assemblies were then ground to bring the main bearing and the crank pin dimensions to the proper size. This removed approximately .010 inch of metal from the cylindrical surface of each bearing. After grinding, the hardness fell within the range of Rockwell C23 to 30.

The material used for main bearings and for crank pins was AISI 8642 steel and the material used for throw arms was AISI 1045 steel. It is to be observed here that a maximum carbon content of not more than 0.7% is preferred in the steel parts.

The pieces were then tested in bending fatigue under the loads indicated in Table I and with the results shown therein.

An additional assembly was made by exactly the same method as those shown in Table I above, except that the connector elements were made from a mixture of 20% bronze and 80% iron powders repressed at 650 tons (75 tons per sq. in.) instead of 780 tons. This assembly when tested in bending fatigue gave the following results:

| Spec. No. | Percent Bronze | Percent Iron | Bending Moment at Critical Section | Cycles to Failure | Type of Break |
|---|---|---|---|---|---|
| 141 | 20 | 80 | 6,300 | 3,020,000 | D. N. B. |

In another series of tests the strengths of bonds made with connector elements having copper-tin as the non-ferrous element were compared with similar connectors having copper-silver as the non-ferrous element. In each case the non-ferrous constituent of the connector was 20% of the total. The connectors were made as follows: 80% electrolytic iron −100 mesh was mixed with the non-ferrous component which in one case consisted of −100 mesh bronze powder containing 10% tin and 90% copper, and in the other case was a copper-silver alloy consisting of 50% silver and 50% copper. Disc-shaped connector elements approximately one-half inch in diameter and 1/32 inch thick were made by briquetting the powdered mixtures at 27 tons per square inch, sintering in dry hydrogen 1300° F. in the case of the silver-copper connectors and at 1500° F. in the case of the copper-tin connectors and thereafter coining the sintered connectors at 90 tons per square inch. Each connector was then ground on both sides to insure flatness. Each connector element was then assembled between two steel cylinders one-half inch in diameter and approximately 1 inch long, to form an assembly 2 1/32 inches long by ½ inch in diameter with the connector in the middle. The assembly was placed in a fixture which maintains a pressure of 70 pounds per square inch between the connector and the steel cylinders. The fixture and assembly was then heated to a bonding temperature in a furnace at 1690° F. in the case of the silver-copper alloy connectors and 2000° F. in the case of the copper-tin connectors. After reaching the aforesaid temperatures the assemblies were held at those temperatures for one-half hour and then cooled while still in the protective atmosphere. The bonded speciments were then ground to a diameter of .480 inch. Transverse breaking tests were then made on the specimens by placing each in a fixture which supports it at the ends, the distance between the supports being 1⅝ inches and applying a load at the connector element sufficient to break the specimen. In each case a number of tests were made and the mean value obtained. The results of these tests are shown in Table II.

*Table II*

STATIC BENDING TESTS COMPARING COPPER-SILVER WITH COPPER-TIN AS THE NON-FERROUS ELEMENT OF THE CONNECTOR ELEMENT

| Kind of Steel Bonded | Mean Breaking Copper-Silver | Load, Lbs. Copper-Tin |
| --- | --- | --- |
| AISI 8630 | 3,390 | 2,880 |
| B 1140 | 2,560 | 3,300 |
| 8640 | 2,400 | 2,670 |

As seen from the results in Table II, the strengths of the two kinds of bonds are of the same order of magnitude. With some steels one has higher strength whereas with different types the other has the higher strength. An important advantage of the silver-copper alloy connectors is their relatively lower bonding temperature, whereas the advantage of the copper-tin alloys is their relatively lower cost.

An important aspect of the mode of assembly described heretofore, that is, of placing the washers 48 so as to overlie the flanges 16 of the bearing parts, is that when the bolts 50 are drawn up tight the flanges will be clamped hard against the connector elements 40 and hence will make doubly sure of the bond at this point which is in the area of maximum stress in the crankshaft under service conditions. The areas of the connector elements in contact with their respective bearing parts are greater on the side of the bolt toward the overlapping area than on the diametrically opposite sides due to the eccentricity of the holes in the connector elements, therefore the bolts which hold the assembly together cause a lower unit pressure on the connectors over the aforesaid greater areas. This is compensated for somewhat by having the washers 48 overlap the flanges as shown in Fig. 2.

From Fig. 2 it is clear that the washer 48 applies pressure to the flange of the bearings at the point where pressure is most needed to insure good contact between the connector element and the bearing flange and throw arm respectively.

Another aspect is the arrangement of the bolts within the holes of the bearing parts. While other means of holding the parts might be employed, such as tack welding, the particular method using internal bolts is of peculiar advantage in that the bolts are protected from the direct radiations of the source of heat during consummation of the bond so that as the assembly comes up to the bonding temperature the parts are subjected to greater and greater pressure which draws them into intimate engagement because of the fact that the bolts do not expand as rapidly as the parts. The aforementioned tack welding would take the place of the internal bolts and would consist of tacking the flanges along their peripheries at two or more points while the parts where held together tightly.

In the cases described and illustrated herein each bearing is shown as being temporarily held to the adjacent parts by a single bolt inside the bearing. In the case of larger crankshafts, however, it may be desirable to use more than one bolt, and the bolts might be left in the assembly after the permanent joint has been made. In any case it is preferred that during the bonding heat treatment the bolts be shielded from the direct heat radiations from the furnace so that they will not heat and expand faster than the bearing surfaces thereby loosening the assembly before the permanent bond has been formed.

While the invention has been specifically illustrated with reference to a crankshaft which is primarily intended for automobile engines, it is within the scope of the invention to use the method in all of its aspects for making crankshaft assemblies for larger engines where the savings in manufacture would be considerable, for example in diesel engines, and for making other composite machines or structural members when it is necessary to join two or more metal parts together.

It should be understood that the present disclosure is for the purpose of illustration only and that this invention includes all modifications and equivalents which fall within the scope of the appended claims.

We claim:

1. The method of joining two ferrous metal parts which method comprises subjecting an assembly of the parts and a preformed, shape-retaining connector element interposed between the ferrous surfaces to a bonding temperature, the connector element consisting essentially of an intimate mixture of unalloyed metal powders compacted at a pressure of from 15 to 100 tons per square inch, said intimate mixture consisting of from 5% to ⅔ part of a low melting metal powder, and from 95% to ⅓ part of a high melting metal powder, the high melting constituent being composed of iron, the low melting metal powder being composed of a material selected from the group consisting of copper, bronze, and copper-tin mixtures in which the copper constitutes at least 60% by weight, and the high melting metal powder providing the shape-retaining skeletal structure of the connector element, said bonding temperature being greater than the melting point of the low melting powder, and less than that of the high melting powder, thereby to bond the skeletal structure to the contiguous ferrous surfaces, and thereafter cooling the integrated structure.

2. The method of joining two or more ferrous metal parts according to claim 1, wherein the lower melting metal powder constitutes 10 to 30% by weight of the mixture.

3. The method of joining two or more ferrous metal parts according to claim 1, wherein the lower melting metal powder constitutes substantially 20% by weight of the mixture.

4. The method of joining two or more ferrous metal parts according to claim 1, wherein the connector element a wafer-like and the bonding temperature is approximately 1900° to 2050° F.

5. The method of joining two or more ferrous metal parts according to claim 1, wherein the connector element is wafer-like and is formed from a mixture of powdered metals first-pressed to shape at 15 to 40 tons per square inch, sintered at 1200° to 1900° F. In a reducing medium and second-pressed at 50 to 100 tons per square inch.

6. The method of joining two or more ferrous metal parts according to claim 1, wherein the connector element is wafer-like and is formed from a mixture of powdered metals first-pressed to shape at approximately 30 tons per square inch, sintered at approximately 1500° F. in a reducing medium, and second-pressed at 60 to 80 tons per square inch.

7. An integrated crankshaft or other composite structure comprising a plurality of components, adjacent components being joined together by a connector element, each connector element consisting essentially of a preformed powdered metal compact composed of an unalloyed mixture of 5% to ⅔ part of a low melting powder and from 95% to ⅓ part of a high melting powder, the high melting powder consisting of iron, the low melting powder being a material selected from the group consisting of copper, bronze, and copper-tin mixtures in which the copper predominates, the high melting powder providing a shape-retaining skeletal structure bonded to said components by said low melting powder.

8. An integrated crankshaft comprising bearing members and throw arms, said bearing members having cylindrical body portions and radial flanges forming extensions of the ends thereof, and fillets at the junctions of the flanges with the cylindrical body portions, each flanged end of a bearing member being united to the side of a throw arm by a wafer-like connector element situated therebetween, each connector element consisting essentially of a preformed powdered metal compact composed of an unalloyed mixture of about 5% to ⅔ part of a low melting powder and from about 95% to ⅓ part of a high melting powder, the high melting powder consisting of iron, the low melting powder being a material selected from the group consisting of copper, bronze, and copper-tin mixtures in which the copper predominates, the high melting powder providing a shape-retaining skeletal structure bonded to said components by said low melting powder.

9. An integrated crankshaft assembly comprising bearing elements and throw arms, said bearing elements having cylindrical surfaces and radially extending flanges at their ends, there being fillets at the junction of the flanges and the cylindrical surfaces, said throw arms having surfaces which are complementary to the end surfaces of the bearings, adjacent component parts being rigidly connected to form a composite structure by a connector element situated between the complementary surfaces and united thereto by bonding, each connector element consisting essentially of a preformed powdered metal compact composed of an unalloyed mixture of about 5% to ⅔ part of a low melting powder and from about 95% to ⅓ part of a high melting powder, the high melting powder consisting of iron, the low melting powder being a material selected from the group consisting of copper, bronze, and copper-tin mixtures in which the copper predominates, the high melting powder providing a shape-retaining skeletal structure bonded to said components by said low melting powder said assembly being characterized in that the maximum fiber stress at the peripheral edge of the connector element is less than the fiber stress in the filleted junction of the bearing surface and the flange when subjected to service conditions.

10. The method of joining two ferrous metal parts which method comprises subjecting an assembly of the parts and a preformed, shape-retaining connector element interposed between the ferrous surfaces to a bonding temperature, the connector element consisting essentially of an intimate unalloyed mixture of powdered metal powders, compacted at a pressure of from 15 to 100 tons per square inch, said intimate unalloyed mixture consisting of not less than 3% and not more than ⅔ part of a low melting powder, and not more than 97% nor less than ⅓ part of a high melting powder, the high melting powder being composed of iron, the low melting powder being composed of a material selected from the group consisting of copper, bronze, copper-tin mixtures in which the copper constitutes at least 60% by weight, an alloy of copper and silver, and a mixture thereof in which the copper constitutes at least 5 to 10% by weight and the high melting powder providing the shape-retaining skeletal structure of the connector element, said bonding temperature being greater than the melting point of the low melting powder and less than that of the high melting powder thereby to bond the skeletal structure to the contiguous ferrous surfaces and thereafter cooling the integrated structure.

11. The method of joining two ferrous metal parts which method comprises subjecting an assembly of the parts and a preformed, shape-retaining connector element interposed between the ferrous surfaces to a bonding temperature, the connector element consisting essentially of an intimate unalloyed mixture of powdered metals, compacted at a pressure of from 15 to 100 tons per square inch, said intimate mixture consisting of not less than 3% and not more than ⅔ part of a low melting powder and not more than 97% nor less than ⅓ part of a high melting powder, the high melting powder being composed of iron, the low melting powder being composed of a material selected from the group consisting of an alloy of copper and silver and a mixture of copper and silver in which the copper constitutes at least 5 to 10% by weight and the high melting powder providing the shape-retaining skeletal structure of the connector element, said bonding temperature being greater than the melting point of the low melting powder and less than that of the high melting powder, thereby to bond the skeletal structure to the contiguous ferrous surfaces, and thereafter cooling the integrated structure.

12. The method of joining two or more ferrous metal parts according to claim 11 wherein the connector element is wafer-like and the bonding temperature is above approximately 1430° F.

13. An integrated crankshaft or other composite structure comprising a plurality of components, adjacent components being joined together by a connector element each connector element consisting essentially of a preformed mixture of unalloyed powdered metals composed of not less than 3% and not more than ⅔ part of a low melting powder and not more than 97% nor less than ⅓ part of high melting powder, the high melting powder consisting of iron, the low melting powder being a material selected from the group consisting of copper, bronze, copper-tin mixtures in which the copper predominates, an alloy of copper and silver and a mixture thereof in which the copper constitutes at least 5 to 10% by weight, the high melting powder providing a shape-retaining skeletal structure bonded to said components by said low melting powder.

14. An integrated crankshaft or other composite structure comprising a plurality of components, adjacent components being joined together by a connector element each connector element consisting essentially of a preformed mixture of unalloyed powdered metals composed of not less than 3% and not more than ⅔ part of a low melting powder and not more than 97% nor less than ⅓ part of high melting powder, the high melting powder consisting of iron, the low melting powder being a material selected from the group consisting of an alloy of copper and silver and a mixture thereof in which the copper constitutes at least 5 to 10% by weight.

15. An integrated crankshaft comprising parts including bearing members and throw arms, each throw arm having integral therewith a portion of a bearing which when placed end to end with the adjacent throw arm and its bearing portion forms a complete bearing between adjacent throw arms, each pair of bearing portions being united end to end by a wafer-like connector element situated therebetween, each connector element consisting essentially of a preformed powdered metal compact composed of an unalloyed mixture of not less than 3% and not more than ⅔ part of a low melting powder and not more than 97% nor less than ⅓ part of a high melting powder, the high melting powder consisting of iron, the low melting powder being of material selected from the group consisting of copper, bronze, copper-tin mixtures in which the copper predominates, an alloy of copper-silver and a mixture of copper and silver in which the copper constitutes not less than 5 to 10%, the high melting powder providing a shape-retaining skeletal structure bonded to said bearing parts by said low melting powder.

16. An integrated crankshaft comprising parts including bearing members and throw arms, each throw arm having integral therewith a portion of a bearing which when placed end to end with the adjacent throw arm and its bearing portion forms a complete bearing between adjacent throw arms, each pair of bearing portions being united end to end by a wafer-like connector element situated therebetween, each connector element consisting essentially of a preformed mixture of unalloyed powdered metals composed of not less than 3% and not more than ⅔ part of a low melting powder and not more than 97% nor less than ⅓ part of a high melting powder, the high melting powder consisting of iron, the low melting powder being of material selected from the group consisting of an alloy of copper and silver and a mixture of copper and silver in which the copper constitutes at least 5 to 10% by weight, the high melting powder providing a shape-retaining skeletal structure bonded to said bearing parts by said low melting powder.

References Cited in the file of this patent

UNITED STATES PATENTS

| | | |
|---|---|---|
| 1,063,323 | Bock | June 3, 1913 |
| 2,229,330 | Langhammer et al. | Jan. 21, 1941 |
| 2,256,726 | Rippingille | Sept. 23, 1941 |
| 2,297,554 | Hardy et al. | Sept. 29, 1942 |
| 2,337,157 | Finley et al. | Dec. 21, 1943 |
| 2,364,109 | Taylor | Dec. 5, 1944 |
| 2,372,202 | Hensel et al. | Mar. 27, 1945 |
| 2,378,686 | Carstens | June 19, 1945 |
| 2,451,099 | La Motte | Oct. 12, 1948 |
| 2,464,591 | Larsen et al | Mar. 15, 1949 |
| 2,606,362 | Martin et al. | Aug. 12, 1952 |